United States Patent [19]

Crawford et al.

[11] 4,219,184
[45] Aug. 26, 1980

[54] FAUCET VALVE ASSEMBLY WITH FRICTION DRAG

[75] Inventors: Dennis W. Crawford, Pontiac; Larry G. Turner, Waterford, both of Mich.

[73] Assignee: Bristol Products, Inc., Elkhart, Ind.

[21] Appl. No.: 966,060

[22] Filed: Dec. 4, 1978

[51] Int. Cl.³ .............................................. F16K 35/04
[52] U.S. Cl. .................................................... 251/297
[58] Field of Search ......................................... 251/297

[56] References Cited

U.S. PATENT DOCUMENTS

| 3,602,340 | 8/1971 | Budzich et al. ................. 251/297 X |
| 3,929,317 | 12/1975 | Cohn et al. ........................ 251/288 X |
| 4,073,308 | 2/1978 | Stith ................................. 251/297 X |

*Primary Examiner*—Gerald A. Michalsky
*Attorney, Agent, or Firm*—Oltsch, Knoblock & Hall

[57] ABSTRACT

A valve assembly for faucets which includes a retainer member carried by the body of the valve with a face circumferentially in frictional contact with the valve stem to prevent independent movement of the stem and handle resulting in an undesired increased or decreased fluid flow.

2 Claims, 3 Drawing Figures

FAUCET VALVE ASSEMBLY WITH FRICTION DRAG

SUMMARY OF THE INVENTION

This invention relates to a faucet valve assembly and will have application to a collar device for restricting rotative movement of the valve stem relative to the valve body.

This invention constitutes an improvement on the valve assembly disclosed in U.S. Pat. No. 3,929,317 by incorporating means for preventing independent movement of the valve stem relative to the body of the valve.

The majority of valve assemblies are made of brass or a similar metal and as such there is sufficient friction between the threaded valve stem and valve body to prevent independent rotation or backing off of the valve. In valve assemblies formed of plastic materials there is a tendency for such independent rotation to occur between the valve stem and body due to the relative low coefficient of friction for the materials.

In this invention a friction inducing component is utilized to increase the effective frictional resistance between the valve stem and value body.

Accordingly, it is an object of this invention to provide a value assembly having means which prevents the independent "backing-off" of plastic faucet assemblies without the use of undue stress.

Another object of this invention is to provide a single means of preventing independent rotation of a value stem in a valve assembly formed of plastic components.

Other objects of the invention will become apparent upon a reading of the invention's description.

BRIEF DESCRIPTION OF THE DRAWINGS

A preferred embodiment of this invention has been chosen for purposes of illustration wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
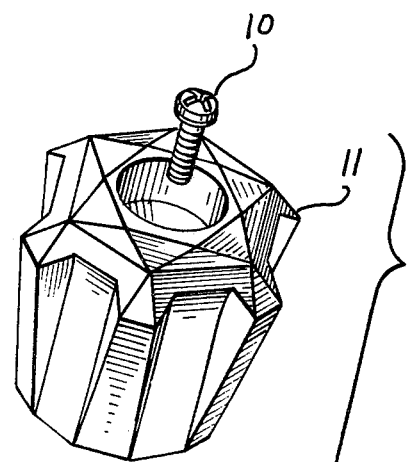
FIG. 1 is an exploded perspective view of the valve assembly.
Figure 2:
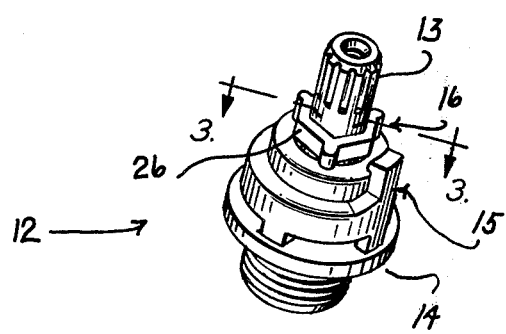
FIG. 2 is a perspective view of the retainer member used in the valve assembly of FIG. 1.
Figure 2:
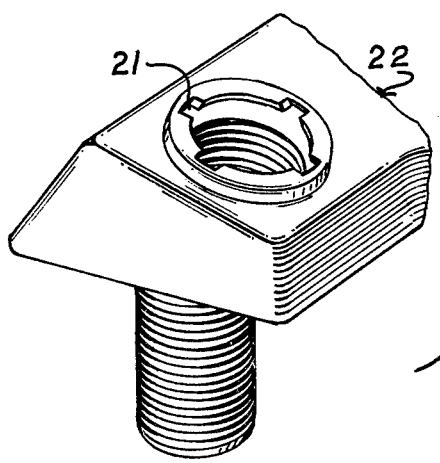
Figure 2:
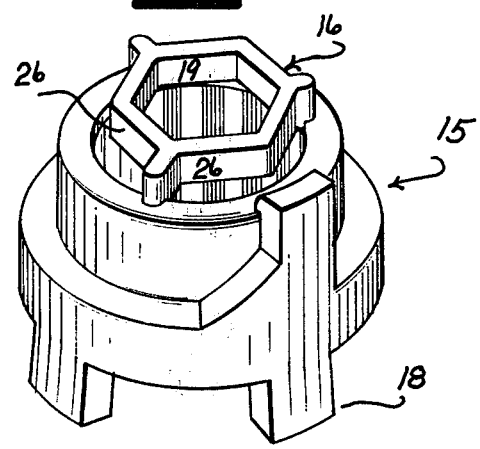
Figure 3:
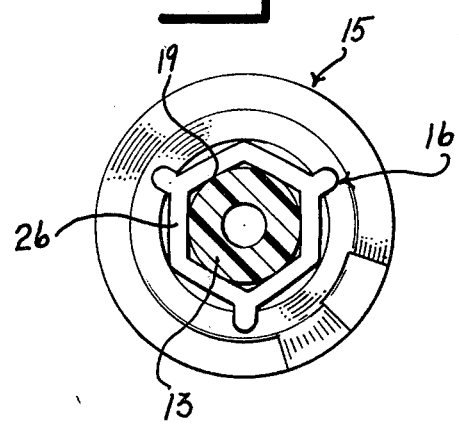
FIG. 3 is a sectional view of the valve assembly through line 3-3 of FIG. 1.

The assembly shown in FIG. 1 includes a handle 11, completed valve body 12 and faucet attachment part or mount 22. Bonnet 14 of valve body 12 is threaded into faucet mount 22 which in turn is connected to a liquid supplying conduit or pipe. With bonnet 14 secure, retainer member 15 of the valve body is placed over valve stem 13 and tabs 18 insert into preformed holes in the bonnet. Tabs 18 also project into holes 21 in faucet mount 22. In this manner valve body 12 is secured against rotation while opening or closing the valve. The valve assembly thus far described is fully disclosed in U.S. Pat. No. 3,929,317.

A restricting collar 16 is carried at the upper end of retainer member 15 and encircles valve stem 13. Restricting collar 16 includes separate side parts 26 which flexibly contact valve stem 13. The inner face 19 of each collar side part 26 is in frictional engagement with valve stem 13. Collar 16 may be formed of polypropolene and stem 13 may be formed of an ethyl cellulose thermoplastic.

Collar 16 in making contact with stem 13 produces a frictional drag upon the stem. This drag enables the stem to be rotated to open and close the valve assembly and be left in a selected position where it will remain until rotated again by the valve user.

It is to be understood that the invention is not to be limited to the details above given but may be modified within the scope of the appended claims.

What we claim is:

1. A valve assembly including in combination a valve body, a faucet attachment part including a fluid conducting component terminating in a valve seat, said valve body in engagement with said faucet attachment part, a stem guided by said valve body and including a valve part shiftable into and out of contact with said valve seat upon rotation of said stem relative to the valve body, a handle carried by said valve stem, the improvement comprising grip parts extending from said valve body and located betweem said handle and valve body frictionally contacting said stem at spaced locations about the circumference of the stem to prevent independent rotation of the stem when said valve assembly is in use.

2. The valve assembly of claim 8 wherein said grip parts are side parts of a multiple-sided collar encircling said stem in a spaced relationship from said valve body.

* * * * *